United States Patent
Tachibana et al.

(10) Patent No.: US 11,858,071 B2
(45) Date of Patent: Jan. 2, 2024

(54) SOLDER ALLOY, SOLDER PASTE, SOLDER BALL, SOLDER PREFORM, AND SOLDER JOINT

(71) Applicant: Senju Metal Industry Co., Ltd., Tokyo (JP)

(72) Inventors: Yoshie Tachibana, Tokyo (JP); Ryuki Horie, Tokyo (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 0 days.

(21) Appl. No.: 17/971,064

(22) Filed: Oct. 21, 2022

(65) Prior Publication Data
US 2023/0127584 A1 Apr. 27, 2023

(30) Foreign Application Priority Data
Oct. 22, 2021 (JP) .................................. 2021-172858

(51) Int. Cl.
*B23K 35/26* (2006.01)
*C22C 13/02* (2006.01)

(52) U.S. Cl.
CPC ............ *B23K 35/262* (2013.01); *C22C 13/02* (2013.01)

(58) Field of Classification Search
None
See application file for complete search history.

(56) References Cited

U.S. PATENT DOCUMENTS

| 8,845,826 B2 | 9/2014 | Kawamata et al. |
| 2010/0307823 A1 | 12/2010 | Kawamata et al. |

FOREIGN PATENT DOCUMENTS

| JP | H10193169 A | 7/1998 |
| JP | H10314980 A | 12/1998 |
| JP | 201465065 A | 4/2014 |
| JP | 201626879 A | 2/2016 |
| JP | 2019209350 A | 12/2019 |
| WO | 0018536 A1 | 4/2000 |
| WO | 2009011341 A1 | 1/2009 |

OTHER PUBLICATIONS

English language machine translation of JP2014065065A to Arai et al. Generated Dec. 12, 2022. (Year: 2022).*

* cited by examiner

*Primary Examiner* — Brian D Walck
(74) *Attorney, Agent, or Firm* — The Webb Law Firm

(57) ABSTRACT

Provided are a solder alloy, a solder paste, a solder ball, a solder preform, and a solder joint, which have a melting temperature within a predetermined range, and high tensile strength and shear strength, suppress generation of voids, and have excellent mountability due to their thin oxide films. The solder alloy has an alloy composition consisting of, by mass %, Ag: 2.5 to 3.7%, Cu: 0.25 to 0.95%, Bi: 3.0 to 3.9%, and In: 0.5 to 2.3%, with the balance being Sn, and the alloy composition satisfies the following relations (1) and (2): $8.1 \leq Ag+2Cu+Bi+In \leq 11.5$ (1), and $1.00 \leq (Bi+In)/Ag \leq 1.66$ (2). Ag, Cu, Bi and In in the relations (1) and (2) each represent the contents (mass %) in the alloy composition.

5 Claims, No Drawings

SOLDER ALLOY, SOLDER PASTE, SOLDER BALL, SOLDER PREFORM, AND SOLDER JOINT

CROSS-REFERENCE TO RELATED APPLICATION

This application claims priority to Japanese Patent Application No. 2021-172858 filed Oct. 22, 2021, the disclosure of which is hereby incorporated by reference in its entirety.

BACKGROUND

Field

The present invention relates to a solder alloy, a solder paste, a solder ball, a solder preform, and a solder joint that have excellent reliability.

Description of Related Art

A power semiconductor device has, for example, a structure in which a plurality of circuit elements and heat sinks are connected to an insulating substrate on which a copper circuit is formed (hereinafter, simply referred to as "DCB (Direct Copper Bonding)"). A process for mounting the power semiconductor device on a substrate involves joining electronic components such as Si chips on the insulating substrate, followed by joining the heat sinks to the substrate. Thus, for example, step soldering, in which reflow soldering of the electronic components and the mounting substrate is performed in the first step and reflow soldering of the heat sink is done in the second step, is employed for mounting the power semiconductor device.

In the first soldering of step soldering, as a high-temperature lead-free solder alloy, for example, a Sn-10Sb solder alloy with a melting point of 245° C. is used. For the second soldering of the step soldering, an alloy composition having a melting temperature lower than the solidus temperature of the solder alloy used for the first soldering is selected.

Examples of the alloy composition with a melting temperature lower than that of the high-temperature lead-free solder alloy include Sn-3Ag-0.5Cu which has been used conventionally. Since the reflow soldering using this solder alloy is usually performed at 235 to 240° C., the temperature difference from the melting point of the high-temperature lead-free solder alloy as described above is small. Therefore, it is difficult to secure a temperature margin when soldering a component with a large heat capacity at the second step soldering. In addition, Sn-3Ag-0.5Cu lacks long-term reliability.

For example, Patent Documents 1 to 3 therefore disclose Sn—Ag—Cu—Bi—In solder alloys containing Bi and In from the viewpoint of improving reliability of the Sn—Ag—Cu solder alloys. In the invention described in Patent Document 1, crack propagation after heat cycle tests, high-speed shear strength, voids, and Cu leaching are evaluated. In the invention described in Patent Document 2, cracking, delamination, and voids are evaluated after heat cycle tests. In the invention described in Patent Document 3, a melting point, and tensile strength and elongation at a high temperature are evaluated.

Patent Document 1: Japanese Unexamined Patent Application Publication No. 2019-209350
Patent Document 2: Japanese Unexamined Patent Application Publication No. 2016-26879
Patent Document 3: Japanese Unexamined Patent Application Publication No. 10-193169

SUMMARY

Patent Document 1 states that a low Bi content reduces a cracking propagation suppressing effect, while a high Bi content causes brittle fracture. Although the strength of the solder alloy is improved by adding In with Bi to the solder alloy, it is also stated that voids are generated in a solder joint depending on In content or combination etc. with other alloy elements since In is an alloy element that is easily oxidized. From this viewpoint, Patent Document 1 discloses a solder alloy containing less than 3 mass % Bi and In to solve these problems. Specifically, Patent Document 1 discloses a Sn-3.0Ag-0.7Cu-2.5Bi-2.0In solder alloy. As a comparative example, it also discloses a Sn-3.0Ag-0.7Cu-3.0Bi-3.0In solder alloy.

Patent Document 2 states that the cracking propagation suppressing effect of the solder joint is improved if the Bi content is a predetermined amount. It is also stated that if a predetermined amount of In is contained, the melting temperature of the lead-free solder alloy is lowered, and mechanical properties and the cracking propagation suppressing effect are improved. Specifically, Patent Document 2 discloses a Sn-3.0Ag-0.5Cu-3.0Bi-0.25In solder alloy.

However, although Patent Documents 1 and 2 describe improved strength of the solder alloys, tensile strength is not specifically evaluated. This is because the inventions described in Patent Documents 1 and 2 only abstractly describe that a certain degree of strength is necessary to suppress cracking propagation. In addition, Patent Document 1 states that oxidation by In is suppressed, but this is only described from the viewpoint of suppressing oxidation due to suppression of void generation. However, at this level of oxidation suppressing effects, a thick oxide film may be formed to some extent during melting and after solidification of the solder alloy, as long as the void generation is suppressed. If the thick oxide film is formed, for example, an oxide residue removed by a flux may increase and wettability may deteriorate when such a solder alloy is used in a paste, leaving room to improve mountability.

Patent Document 3 states that combined addition of In and Bi to Sn—Ag solder alloys, as well as addition of Cu, can lower the melting point and impart excellent mechanical properties. However, some of the solder alloys specifically disclosed in Patent Document 3 have a high liquidus temperature (hereinafter referred to as "melting temperature" as appropriate) and thus contain alloy compositions that are not suitable for step soldering. On the other hand, a Sn-3.0Ag-1.0Cu-3.0Bi-1.0In solder alloy and a Sn-3.0Ag-0.5Cu-3.0Bi-1.0In solder alloy are disclosed as alloy compositions with relatively low melting temperatures. However, in the invention described in Patent Document 3, although tensile strength and wettability are evaluated, shear strength required for solder joints is not evaluated, nor is the suppression of void generation evaluated. For this reason, even the solder alloys described in Patent Document 3 have low shear strength and may generate voids, leaving room for improvement.

Thus, even though the solder alloys described in Patent Documents 1 to 3 can solve respective problems, it is still difficult to conclude that they can solve various problems in step soldering since actual conditions during mounting, for example, of power semiconductor devices, are not taken into consideration. In other words, the inventions described in these documents cannot simultaneously satisfy the desired melting point, high tensile strength and shear strength, suppression of void generation, and thinning of the oxidation film, as disclosed in Patent Document 1 to 3. As described above, although the inventions described in Patent Documents 1 to 3 focus on Bi and In contents, Ag and Cu are adjusted separately. Solder alloys can only exhibit their inherent effects when all of the constituent elements are integrated, rather than when each constituent element functions separately. Therefore, it is required that each constituent element be contained in a well-balanced manner as a whole so that various problems in mounting power semiconductor devices can be simultaneously solved. In order to provide a solder alloy that can simultaneously solve all of the above problems, further compositional search is essential.

An object of the present invention is therefore to provide a solder alloy, a solder paste, a solder ball, a solder preform, and a solder joint, which have a melting temperature within a predetermined range, high tensile strength and shear strength, suppress void generation, and have excellent mountability due to their thin oxide films.

The inventors focused on the need for the solder alloys disclosed in the patent documents to be applicable to step soldering. As mentioned above, since the Sn-3Ag-0.5 Cu solder alloy has a reflow temperature of 235 to 240° C., it may be necessary to perform reflow soldering at a higher temperature side of the temperature range shown on the above when components with large heat capacity are used. Thus, it is difficult to secure a temperature margin in the case of the Sn-3Ag-0.5Cu solder alloy. The present inventors, therefore, in consideration of such temperature margins, first investigated the content of each constituent element so that the melting temperature would be 190 to 220° C. This temperature range is a temperature range with a margin to ensure that the high-temperature lead-free solder alloy does not melt in the second reflow soldering.

The present inventors have studied to improve shear strength and suppress void generation in the Sn-3.0Ag-1.0Cu-3.0Bi-1.0In solder alloy and the Sn-3.0Ag-0.5Cu-3.0Bi-1.0In solder alloy, which have a melting temperature of 220° C. or less and high tensile strength, as disclosed in Patent Document 3. It was found that the Sn-3.0Ag-1.0Cu-3.0Bi-1.0In solder alloy has lower tensile and shear strength due to the formation of intermetallic compounds of Sn and Cu with high Cu content. It was also found that the Sn-3.0Ag-0.5Cu-3.0Bi-1.0In solder alloy is not significantly out of line in terms of the content of each constituent element, but had inferior tensile strength. From such findings, it was found that even if each constituent element is within the predetermined range, the desired effect cannot be obtained due to the balance of additive elements and other factors.

The present inventors also studied a Sn-3.0Ag-0.7Cu-3.0Bi-3.0In solder alloy and Sn-3.0Ag-0.7Cu-2.5Bi-2.0In solder alloy described in Patent Document 1 and the Sn-3.0Ag-0.5Cu-3.0Bi-0.25In solder alloy described in Patent Document 2, in which the void generation is suppressed. It was found that in the Sn-3.0Ag-0.7Cu-3.0Bi-3.0In solder alloy, the void generation is not sufficiently suppressed due to high In content, and its oxide film becomes thick. It was found that the Sn-3.0Ag-0.7Cu-2.5Bi-2.0In solder alloy has inferior tensile strength due to its low Bi content. It was found that the Sn-3.0Ag-0.5Cu-3.0Bi-0.25In solder alloy has inferior tensile strength due to its low In content.

Thus, in the inventions described in Patent Documents 1 to 3, it was found that the improvement of tensile strength and shear strength, the suppression of void generation, and the reduction in thickness of the oxide film cannot be achieved simultaneously for each. Based on the above findings, it was also found that these cannot be achieved simultaneously simply by having the content of each constituent element within a predetermined range.

Therefore, in consideration of the overall balance, the content of each constituent element has been further investigated in detail within the above-mentioned range. As a result, it was found that the improvement of tensile strength and shear strength, the suppression of void generation, and the reduction in the thickness of the oxide film can be achieved simultaneously for the first time when the content of each constituent element is within a specific range, Ag, Cu, Bi, and In satisfy a predetermined relational expression, and further that Ag, Bi, and In satisfy a predetermined relational expression. Note that the present invention provides an example of a power semiconductor device but is not limited to such an application as long as it is necessary to simultaneously exhibit these effects. The present invention obtained based on these findings is as follows.

(1) A solder alloy having an alloy composition consisting of, by mass %,
Ag: 2.5 to 3.7%,
Cu: 0.25 to 0.95%,
Bi: 3.0 to 3.9%, and
In: 0.5 to 2.3%. with the balance being Sn,
wherein the alloy composition satisfies the following relations (1) and (2).

$$8.1 \leq Ag+2Cu+Bi+In \leq 11.5 \qquad \text{relation (1)}$$

$$1.00 \leq (Bi+In)/Ag \leq 1.66 \qquad \text{relation (2)}$$

wherein Ag, Cu, Bi, and In in the relations (1) and (2) each represent the contents (mass %) thereof in the alloy composition.

(2) The solder alloy according to (1), wherein the alloy composition satisfies the following relation (3):

$$4.48 \leq Ag \times Cu \times Bi \times In \leq 7.7 \qquad \text{relation (3)}$$

wherein Ag, Cu, Bi, and In in the relation (3) each represent the contents (mass %) thereof in the alloy composition.

(3) A solder paste comprising a solder powder containing the solder alloy according to (1) or (2).

(4) A solder ball comprising the solder alloy according to (1) or (2).

(5) A solder preform comprising the solder alloy according to (1) or (2).

(6) A solder joint comprising the solder alloy according to (1) or (2).

DETAILED DESCRIPTION

The present invention is described in more detail below. In the present specification, "%" used for indicating a solder alloy composition is "mass %" unless otherwise specified.

1. Solder Alloy (1) Ag: 2.5 to 3.7%

Ag can avoid an increase in melting temperature if its content is close to a SnAgCu eutectic composition. It also enables precipitation strengthening of a solder alloy because $Ag_3Sn$ is precipitated in granular form. If the Ag content is less than 2.5%, the melting temperature of the solder alloy increases due to hypoeutectic SnAgCu. In addition, strength is not improved since the amount of the compounds precipitated is small. In terms of the lower limit, the Ag content is 2.5% or more, preferably 2.8% or more, and more preferably 2.9% or more.

On the other hand, if the Ag content exceeds 3.7%, the melting temperature of the solder alloy increases due to hypereutectic SnAgCu. In addition, coarse $Ag_3Sn$ precipitates in a plate-like form, resulting in deteriorated strength. In terms of the upper limit, the Ag content is 3.7% or less, preferably 3.2% or less, and more preferably 3.1% or less.

(2) Cu: 0.25 to 0.95%

The closer both Cu and Ag contents are to the SnAgCu eutectic composition, the lower the melting temperature of the solder alloy. If the Cu content is less than 0.25%, the melting temperature of the solder alloy increases due to hypoeutectic SnAgCu. In terms of the lower limit, the Cu content is 0.25% or more, preferably 0.45% or more, and more preferably 0.55% or more.

On the other hand, if the Cu content exceeds 0.95%, tensile strength and shear strength are reduced due to a large amount of Sn and Cu compounds precipitated. As the Cu content further increases, the melting temperature of the solder alloy increases due to hypereutectic SnAgCu in addition to the deterioration of strength. In terms of the upper limit, the Cu content is 0.95% or less, preferably 0.80% or less, and more preferably 0.70% or less.

(3) Bi: 3.0 to 3.9%

Bi can avoid the increase in melting temperature and also improves the strength of the solder alloy by solid solution strengthening of Sn. If the Bi content is less than 3.0%, the strength is not sufficiently improved since the solid solution amount of Bi is small. In addition, the melting temperature of the solder alloy is not lowered. In terms of the lower limit, the Bi content is 3.0% or more, preferably 3.1% or more, and more preferably 3.2% or more.

On the other hand, if the Bi content exceeds 3.9%, the solidus temperature lowers due to eutectic SnBi precipitated. Furthermore, Bi may segregate to grain boundaries, resulting in deterioration of strength of the solder alloy. In terms of the upper limit, the Bi content is 3.9% or less, preferably 3.8% or less, more preferably 3.7% or less, and further preferably 3.4% or less.

(4) In: 0.5 to 2.3%

In can avoid the increase in melting temperature and also improves the strength of the solder alloy by solid solution strengthening of Sn. If the In content is less than 0.5%, the strength is not sufficiently improved since the solid solution amount of In is small. In addition, the melting temperature of the solder alloy is not lowered. In terms of the lower limit, the In content is 0.5% or more, preferably 0.7% or more, more preferably 0.9% or more, and even more preferably 1.0% or more.

On the other hand, if the In content exceeds 2.3%, molten solder is easily oxidized, and thus generation of voids cannot be suppressed. In addition, an oxide film thereof becomes thicker, resulting in poor mountability. Furthermore, the melting temperature becomes too low. In terms of the upper limit, the In content is 2.3% or less, preferably 1.5% or less, and more preferably 1.3% or less.

(5) Relations (1) and (2)

$$8.1 \leq Ag+2Cu+Bi+In \leq 11.5 \quad \text{Relation (1)}$$

$$1.00 \leq (Bi+In)/Ag \leq 1.66 \quad \text{Relation (2)}$$

Ag, Cu, Bi, and In in the relations (1) and (2) each represent the contents (mass %) thereof in the alloy composition.

The solder alloy according to the present invention contains appropriate amounts of additive elements by satisfying the relation (1), and thus the melting temperature is in a proper range. These additive elements constituting the solder alloy according to the present invention affect tensile strength and shear strength since all of them contribute to Sn. It contributes to the solid solution strengthening of Sn, although addition of large amounts of In may cause voids and an increase in the thickness of an oxide film. For this reason, the relation (1) needs to be satisfied indirectly to suppress the generation of voids and reduce the thickness of the oxide film. Therefore, the relation (1) is a relational expression that must be satisfied in order to exhibit the effect of the present invention. Note that the coefficient of Cu in the relation (1) is doubled. In the solder alloy according to the present invention, this tends to significantly affect various properties of the solder alloy if the Cu content changes even slightly. For example, focusing on the melting temperature, when the amount of increase or decrease in the Cu content is the same as the amount of increase or decrease in the content of any other element, Cu is estimated to change the melting temperature at least twice larger than the other element.

The solder alloy according to the present invention can also exhibit higher strength by satisfying the relation (2). Ag is a precipitation strengthening element, while Bi and In are solution strengthening elements. If the content of a solution strengthening element is too large, the element may exist in excess because the element content exceeds the solid solution limit, and may cause segregation of Bi or deformation of the solder alloy. On the other hand, if the content of the precipitation strengthening element is too large, the strength rather decreases due to a large amount of the compound precipitated. The solder alloy according to the present invention can therefore strengthen Sn in a well-balanced manner by satisfying relation (2), although each element has an optimum content range as described above.

These relations are obtained by the interdependence of the constituent elements. This is because an alloy is an integrated object formed by combination of all constituent elements, and the constituent elements influence each other. Thus, the solder alloy according to the present invention, which is adjusted to the optimum content of each constituent element and further satisfies the relations (1) and (2), is set to a range where the interdependence of the constituent elements is fully considered. Accordingly, in the second soldering of step soldering, the solder alloy according to the present invention can simultaneously satisfy optimum melting temperature, high tensile and shear strength, suppression of void generation, and thin oxide films.

In terms of the lower limit, the relation (1) is 8.1 or more, preferably 8.2 or more, more preferably 8.3 or more, further preferably 8.4 or more, particularly preferably 8.5 or more, and most preferably 8.6 or more. In terms of the upper limit, the relation (1) is preferably 11.5 or less, more preferably 9.3 or less, further preferably 9.1 or less, even further preferably 8.9 or less, particularly preferably 8.8 or less, and most preferably 8.7 or less.

In terms of the lower limit, the relation (2) is 1.00 or more, preferably 1.14 or more, more preferably 1.23 or more, even further preferably 1.28 or more, particularly preferably 1.30 or more, and most preferably 1.31 or more, and may be 1.33 or more and 1.35 or more. In terms of the upper limit, the relation (2) is 1.66 or less, preferably 1.64 or less, more preferably 1.63 or less, further preferably 1.62 or less, even further preferably 1.57 or less, particularly preferably 1.50 or less, and most preferably 1.45 or less, and may be 1.42 or less and 1.40 or less.

(6) Balance: Sn The balance of the solder alloy according to the present invention is Sn. The solder alloy may contain unavoidable impurities besides the elements described above. Even when the solder alloy contains unavoidable impurities, this inclusion does not affect the effects described above. The solder alloy according to the present invention preferably does not contain Co and Ni because they increase the melting temperature.

(7) Relation (3)

$$4.48 \leq Ag \times Cu \times Bi \times In \leq 7.7 \qquad \text{Relation (3)}$$

Ag, Cu, Bi, and In in the relation (3) each represent the contents (mass %) thereof in the alloy composition.

The relation (3) is a relational consideration for the balance among additive elements, and the embodiment satisfying the relation (3) is preferable. The relation (3) is highly interdependent on each element because it is multiplied by the content of each element, and the overall balance of the solder alloy is maintained at a high level when the relation (3) is satisfied. Accordingly, it is preferred in terms of the further optimum of melting temperature, further improvement tensile and shear strength, further suppression of void generation, and further thinning of oxide films. In terms of the lower limit, the relation (3) is preferably 4.48 or more, more preferably 4.70 or more, further preferably 4.75 or more, particularly preferably 4.82 or more, most preferably 5.28 or more, and may be 5.76 or more, 6.27 or more, 6.50 or more, and 6.51 or more. In terms of the upper limit, the relation (3) is preferably 7.7 or less, more preferably 7.17 or less, further preferably 7.14 or less, even further preferably 6.94 or less, and most preferably 6.72 or less.

(8) Melting Temperature of Solder Alloy

The solder alloy according to the present invention are preferably used for the second soldering when soldering is performed twice, for example, by step soldering. In such a use, the melting temperature of the solder alloy used for the second time is preferably lower than the solidus temperature of the solder alloy used for the first time. For example, in the case of using a Sn-10Sb solder alloy that melts at a melting temperature of 245° C. in the first soldering, a sufficient temperature margin is considered for the use of components with large heat capacity. The melting temperature of the solder alloy according to the present invention is preferably 211 to 220° C. and particularly preferably 211 to 214° C.

The solidus temperature of the solder alloy according to the present invention should be in a temperature range where a temperature difference between the melting temperature and the solidus temperature is not too large, and the mountability of the component does not deteriorate, due to leaching, misalignment, reoxidation, generation of voids or the like. The solidus temperature of the solder alloy according to the present invention is preferably 198° C. or more, more preferably 200° C. or more, further preferably 203° C. or more, and particularly preferably 204° C. or more. The upper limit of the solidus temperature of the solder alloy according to the present invention is not particularly limited, but may be 211° C. or less.

2. Solder Paste

The solder paste according to the present invention is a mixture of a solder powder containing the solder alloy having the alloy composition described above and a flux. The flux used in the present invention is not particularly limited as long as it is suitable for soldering by a conventional method. Accordingly, a commonly used rosin, an organic acid, an activator, and a solvent may be blended as appropriate for use. In the present invention, a blending ratio of a metal powder component to a flux component is not particularly limited, but preferably the metal powder component is 80 to 90 mass % while the flux component is 10 to 20 mass %.

3. Solder Ball

The solder alloy according to the present invention can be used as a solder ball. The solder ball according to the present invention is used for forming bumps on electrodes and substrates of semiconductor packages such as BGA (ball grid array). The diameter of the solder ball according to the present invention is preferably in the range of 1 to 1000 μm. The solder ball can be manufactured by a general solder ball manufacturing method.

4. Solder Preform

The shape of the solder preform according to the present invention is not limited and it can be used in the form of a plate, a ring, a cylinder, a ribbon, a square, a disc, a washer, a chip, a wire, or the like. The solder preform may internally contain high-melting metal grains (e.g., Ni or Cu grains and alloy powder mainly composed of Ni or Cu) whose melting point is higher than that of the solder alloy and which are easily wetted by the molten solder.

5. Solder Joint

The solder joint according to the present invention is suitably used for joining at least two or more members to be joined. The members to be joined are, for example, a circuit element, a substrate, an electronic component, a printed circuit board, an insulating substrate, a heat sink, a lead frame, a semiconductor using electrode terminals, etc., as well as a power module and an inverter product, and are not particularly limited as long as they are electrically connected using the solder alloy according to the present invention.

6. Other

The solder alloy according to the present invention enables a low α-ray alloy to be produced by using a low α-ray material as a raw material therefor. When such a low α-ray-alloy is used for forming solder bumps in the periphery of a memory, soft errors can be suppressed.

EXAMPLES

The present invention will be described by the following Examples, but the present invention is not limited to the following Examples. In order to demonstrate the effects of the present invention, melting temperature, tensile strength, shear strength, void area ratio, and thickness of an oxide film were measured using the solder alloy listed in Table 1.

(1) Melting Temperature

For solder alloys having alloy compositions each listed in Table 1, each temperature was determined from a DSC curve. The DSC curve was obtained by DSC (model: EXSTAR 6000) manufactured by Hitachi High-Tech Science Corporation by increasing the temperature at 5° C./min in the atmosphere. The liquidus temperature was determined from the obtained DSC curve and used as the melting temperature. The solidus temperature was also evaluated from the DSC curve.

When the melting temperature is 211 to 214° C., the temperature margin was sufficient for the second soldering in step soldering and thus was evaluated as "Excellent". When the melting temperature is 215 to 220° C., it was evaluated as "Good" since there was no problem in practical use. When the temperature was less than 211° C. and exceeds 220° C., it was evaluated as "Poor". When the solidus temperature was 204 to 211° C., it was evaluated as "Excellent". When the solidus temperature was 198 to 203° C., it was evaluated as "Good". When the temperature was less than 204° C. and exceeds 211° C., it was evaluated as "Poor".

(2) Tensile Strength

The tensile strength was measured in accordance with JIS Z 3198-2. Each of the solder alloys listed in Table 1 was cast into a mold to produce a specimen with a gauge length of 30 mm and a diameter of 8 mm. The produced specimen was pulled by Type 5966 manufactured by Instron Corporation at room temperature at a stroke of 6 mm/min to measure the strength upon fracture of the specimen. In the present invention, when the tensile strength was 67 MPa or more, it was evaluated as "Excellent" because of its sufficient strength. When the tensile strength was less than 67 MPa and 63 MPa or more, it was evaluated as "Good" since there was no problem in practical use. When the tensile strength was less than 63 MPa, it was evaluated as "Poor".

(3) Shear Strength

Solder alloy powders having the solder alloy compositions listed in Table 1 with an average particle size of 20 μm were produced, and the produced solder alloy powders were mixed with a known rosin flux in a ratio of 89 mass % to 11 mass % to produce a solder paste of each solder alloy. The solder paste was printed on a Cu-electrode in a printed circuit board (material: FR-4) having a thickness of 0.8 mm with a metal mask having a thickness of 120 μm, and a chip resistor component was mounted with a mounter, and reflow soldering was performed at a maximum temperature of 235° C. and a holding time of 60 seconds to produce a test substrate.

The shear strength (N) of this test substrate was measured by a shear strength measuring device (STR-1000 manufactured by RHESCA Corporation) under a condition of 6 mm/min. When the shear strength was 67 N or more, it was judged to be at a level of sufficient shear strength and evaluated as "Excellent". When the shear strength was more than 63 N and 66 N or less, it was judged to be at a level capable of being used practically without any problem and evaluated as "Good". When the shear strength was less than 62 N, it was evaluated as "Poor".

(4) Void Area Ratio

As to the test substrate produced in "Shear Strength", the X-ray plane image with 30-fold magnification was displayed on a monitor using a TOSMICRON-6090FP manufactured by Toshiba FA System Engineering Co., Ltd., and voids were detected from the displayed image to determine an area ratio thereof. The image analysis software used for the detection was Scandium, manufactured by Soft imaging system. Because the contrast between the voids and the other parts on the image is different, they can be identified using image analysis, and the measurement was performed by detecting only the voids. When the measured void area ratio was 3.2% or less of the silicon chip area, the void was evaluated as "Excellent"; when the void area ratio was more than 3.2% and 4.1% or less, the void was evaluated as "Good": and when the void area ratio was more than 4.1%, the void was evaluated as "Poor".

(5) Thickness of Oxide Film

The solder alloys listed in Table 1 were processed into ribbon-shaped preforms having a thickness of 0.1 mm, cut into 10 mm square preforms, and subjected to heat treatment in a thermostatic bath at 150° C. for 120 minutes. The oxide film thickness of the obtained preforms was measured by FE-AES (Field Emission Auger Electron Spectroscopy) to measure the thickness of the oxide film. The film thickness of the oxide film was measured with the following device under the following conditions. Note that a measured value of the thickness of the oxide film was obtained in terms of $SiO_2$. When the thickness of the oxide film was 1.8 nm or less, it was evaluated as "Excellent" since formation of the oxide film was sufficiently suppressed. When the thickness of the oxide film was more than 1.8 nm and 2.8 nm or less, it was evaluated as "Good" since the film could be mounted without any problem. When the thickness of the oxide film was more than 2.8 nm, it was evaluated as "Poor".

Measuring device: scanning FE-Auger Electron Spectroscopic Analyzer manufactured by ULVAC-PHI, INC.
Measuring conditions: 10 kV of Beam Voltage; 10 nA of Sample Current (The measuring method of sputtered depth by using an Ar ion gun is based on ISO/TR 15969)

Evaluation results are shown in Tables 1 and 2.

TABLE 1

| | Solder Composition (mass %) | | | | | | Relation (1) | Relation (2) | Relation (3) | Melting temperature (° C.) |
|---|---|---|---|---|---|---|---|---|---|---|
| | Sn | Ag | Cu | Bi | In | Other | | | | |
| Ex. 1 | Bal. | 2.5 | 0.80 | 3.2 | 0.90 | — | 8.20 | 1.64 | 5.76 | Excellent |
| Ex. 2 | Bal. | 2.8 | 0.70 | 3.2 | 1.00 | — | 8.40 | 1.50 | 6.27 | Excellent |
| Ex. 3 | Bal. | 2.9 | 0.70 | 3.2 | 1.00 | — | 8.50 | 1.45 | 6.50 | Excellent |
| Ex. 4 | Bal. | 3.0 | 0.70 | 3.2 | 1.00 | — | 8.60 | 1.40 | 6.72 | Excellent |
| Ex. 5 | Bal. | 3.1 | 0.70 | 3.2 | 1.00 | — | 8.70 | 1.35 | 6.94 | Excellent |
| Ex. 6 | Bal. | 3.2 | 0.70 | 3.2 | 1.00 | — | 8.80 | 1.31 | 7.17 | Excellent |
| Ex. 7 | Bal. | 3.7 | 0.70 | 3.2 | 1.00 | — | 9.30 | 1.14 | 8.29 | Good |
| Ex. 8 | Bal. | 3.0 | 0.25 | 3.2 | 1.50 | — | 8.20 | 1.57 | 3.60 | Good |
| Ex. 9 | Bal. | 3.0 | 0.45 | 3.2 | 1.10 | — | 8.20 | 1.43 | 4.75 | Excellent |
| Ex. 10 | Bal. | 3.0 | 0.55 | 3.2 | 1.00 | — | 8.30 | 1.40 | 5.28 | Excellent |
| Ex. 11 | Bal. | 3.0 | 0.95 | 3.2 | 1.00 | — | 9.10 | 1.40 | 9.12 | Good |
| Ex. 12 | Bal. | 3.0 | 0.70 | 3.0 | 1.00 | — | 8.40 | 1.33 | 6.30 | Excellent |
| Ex. 13 | Bal. | 3.0 | 0.70 | 3.1 | 1.00 | — | 8.50 | 1.37 | 6.51 | Excellent |
| Ex. 14 | Bal. | 3.0 | 0.70 | 3.4 | 1.00 | — | 8.80 | 1.47 | 7.14 | Excellent |
| Ex. 15 | Bal. | 3.0 | 0.70 | 3.9 | 1.00 | — | 9.30 | 1.63 | 8.19 | Excellent |
| Ex. 16 | Bal. | 3.0 | 0.75 | 3.2 | 0.50 | — | 8.20 | 1.23 | 3.60 | Good |
| Ex. 17 | Bal. | 3.0 | 0.70 | 3.2 | 0.70 | — | 8.30 | 1.30 | 4.70 | Excellent |
| Ex. 18 | Bal. | 3.0 | 0.70 | 3.2 | 1.30 | — | 8.90 | 1.50 | 8.74 | Good |
| Ex. 19 | Bal. | 3.2 | 0.70 | 3.0 | 2.30 | — | 9.90 | 1.66 | 15.46 | Excellent |
| Ex. 20 | Bal. | 3.7 | 0.90 | 3.8 | 2.20 | — | 11.50 | 1.62 | 27.84 | Good |
| Ex. 21 | Bal. | 3.0 | 0.45 | 3.2 | 1.00 | — | 8.10 | 1.40 | 4.32 | Good |
| Ex. 22 | Bal. | 3.7 | 0.65 | 3.1 | 0.60 | — | 8.70 | 1.00 | 4.47 | Excellent |

TABLE 1-continued

|  | Solidus temperature (° C.) | Tensile strength (MPa) | Shear strength (Mpa) | Void | Thickness of oxide film (nm) | Total evaluation |
|---|---|---|---|---|---|---|
| Ex. 1 | Excellent | Excellent | Excellent | Excellent | Excellent | Excellent |
| Ex. 2 | Excellent | Excellent | Excellent | Excellent | Excellent | Excellent |
| Ex. 3 | Excellent | Excellent | Excellent | Excellent | Excellent | Excellent |
| Ex. 4 | Excellent | Excellent | Excellent | Excellent | Excellent | Excellent |
| Ex. 5 | Excellent | Excellent | Excellent | Excellent | Excellent | Excellent |
| Ex. 6 | Excellent | Excellent | Excellent | Excellent | Excellent | Excellent |
| Ex. 7 | Good | Excellent | Excellent | Good | Good | Good |
| Ex. 8 | Excellent | Excellent | Excellent | Good | Good | Good |
| Ex. 9 | Excellent | Excellent | Excellent | Excellent | Excellent | Excellent |
| Ex. 10 | Excellent | Excellent | Excellent | Excellent | Excellent | Excellent |
| Ex. 11 | Excellent | Excellent | Excellent | Good | Good | Good |
| Ex. 12 | Excellent | Excellent | Excellent | Excellent | Excellent | Excellent |
| Ex. 13 | Excellent | Excellent | Excellent | Excellent | Excellent | Excellent |
| Ex. 14 | Excellent | Excellent | Excellent | Excellent | Excellent | Excellent |
| Ex. 15 | Good | Excellent | Excellent | Good | Good | Good |
| Ex. 16 | Excellent | Good | Good | Excellent | Excellent | Good |
| Ex. 17 | Excellent | Excellent | Excellent | Excellent | Excellent | Excellent |
| Ex. 18 | Good | Excellent | Excellent | Good | Good | Good |
| Ex. 19 | Good | Excellent | Excellent | Good | Good | Good |
| Ex. 20 | Good | Excellent | Excellent | Good | Good | Good |
| Ex. 21 | Excellent | Excellent | Excellent | Excellent | Excellent | Good |
| Ex. 22 | Excellent | Good | Good | Excellent | Excellent | Good |

Ex = Example

TABLE 2

|  | Solder Composition (mass %) | | | | | | Relation (1) | Relation (2) | Relation (3) | Melting temperature (° C.) |
|---|---|---|---|---|---|---|---|---|---|---|
|  | Sn | Ag | Cu | Bi | In | Other | | | | |
| Comp. Ex. 1 | Bal. | 2.4 | 0.95 | 3.1 | 0.70 | — | 8.10 | 1.58 | 4.95 | Poor |
| Comp. Ex. 2 | Bal. | 3.9 | 0.70 | 3.2 | 1.10 | — | 9.60 | 1.10 | 9.61 | Poor |
| Comp. Ex. 3 | Bal. | 3.0 | 0.20 | 3.2 | 1.50 | — | 8.10 | 1.57 | 2.88 | Poor |
| Comp. Ex. 4 | Bal. | 3.0 | 1.0 | 3.0 | 1.0 | — | 9.00 | 1.33 | 9.00 | Good |
| Comp. Ex. 5 | Bal. | 3.0 | 1.0 | 3.0 | 0.8 | — | 8.80 | 1.27 | 7.20 | Good |
| Comp. Ex. 6 | Bal. | 3.0 | 2.0 | 3.2 | 1.0 | — | 11.20 | 1.40 | 19.20 | Poor |
| Comp. Ex. 7 | Bal. | 3.5 | 0.80 | 0.5 | 6.00 | — | 11.60 | 1.86 | 8.40 | Poor |
| Comp. Ex. 8 | Bal. | 3.0 | 0.70 | 2.5 | 2.00 | — | 8.90 | 1.50 | 10.50 | Poor |
| Comp. Ex. 9 | Bal. | 3.1 | 0.50 | 4.1 | 1.00 | — | 9.20 | 1.65 | 6.36 | Poor |
| Comp. Ex. 10 | Bal. | 3.0 | 0.50 | 3.0 | 0.25 | — | 7.25 | 1.08 | 1.13 | Poor |
| Comp. Ex. 11 | Bal. | 3.0 | 0.80 | 3.2 | 0.30 | — | 8.10 | 1.17 | 2.30 | Poor |
| Comp. Ex. 12 | Bal. | 3.0 | 0.70 | 3.0 | 3.00 | — | 10.40 | 2.00 | 18.90 | Poor |
| Comp. Ex. 13 | Bal. | 3.0 | 0.50 | 3.0 | 1.00 | — | 8.00 | 1.33 | 4.50 | Poor |
| Comp. Ex. 14 | Bal. | 3.7 | 0.95 | 3.9 | 2.20 | — | 11.70 | 1.65 | 30.16 | Poor |
| Comp. Ex. 15 | Bal. | 3.7 | 0.70 | 3.0 | 0.50 | — | 8.60 | 0.95 | 3.89 | Good |
| Comp. Ex. 16 | Bal. | 2.5 | 0.70 | 3.2 | 2.00 | — | 9.10 | 2.08 | 11.20 | Good |
| Comp. Ex. 17 | Bal. | 3.0 | 0.70 | 3.0 | 1.00 | Ni: 0.1 | 8.40 | 1.33 | 6.30 | Poor |
| Comp. Ex. 18 | Bal. | 3.0 | 0.70 | 3.0 | 1.00 | Co: 0.1 | 8.40 | 1.33 | 6.30 | Poor |

TABLE 2-continued

| | | Solidus temperature (° C.) | Tensile strength (MPa) | Shear strength (Mpa) | Void | Thickness of oxide film (nm) | Total evaluation |
|---|---|---|---|---|---|---|---|
| | Comp. Ex. 1 | Poor | Poor | Poor | Excellent | Excellent | Poor |
| | Comp. Ex. 2 | Poor | Poor | Poor | Good | Good | Poor |
| | Comp. Ex. 3 | Poor | Good | Good | Good | Good | Poor |
| | Comp. Ex. 4 | Good | Poor | Poor | Good | Good | Poor |
| | Comp. Ex. 5 | Good | Poor | Poor | Excellent | Excellent | Poor |
| | Comp. Ex. 6 | Poor | Poor | Poor | Good | Good | Poor |
| | Comp. Ex. 7 | Poor | Poor | Poor | Poor | Poor | Poor |
| | Comp. Ex. 8 | Poor | Poor | Poor | Good | Good | Poor |
| | Comp. Ex. 9 | Poor | Poor | Poor | Good | Good | Poor |
| | Comp. Ex. 10 | Poor | Poor | Poor | Good | Good | Poor |
| | Comp. Ex. 11 | Poor | Poor | Poor | Good | Good | Poor |
| | Comp. Ex. 12 | Poor | Poor | Poor | Poor | Poor | Poor |
| | Comp. Ex. 13 | Poor | Good | Good | Good | Good | Poor |
| | Comp. Ex. 14 | Poor | Poor | Poor | Poor | Poor | Poor |
| | Comp. Ex. 15 | Good | Poor | Poor | Excellent | Excellent | Poor |
| | Comp. Ex. 16 | Good | Poor | Poor | Good | Poor | Poor |
| | Comp. Ex. 17 | Excellent | Good | Good | Poor | Good | Poor |
| | Comp. Ex. 18 | Excellent | Good | Good | Poor | Good | Poor |

Comp. Ex. = Comparative Example
The underline indicates that it does not fall within the scope of the present invention.

As is clear from Table 1, Examples 1 to 22 each have Ag, Cu, Bi, and In contents within the scope of the present invention and also satisfy the relations (1) and (2). For this reason, it was clear that the melting temperature was low enough to allow soldering by step soldering, the tensile strength and shear strength were high, the void area ratio was low, and the thickness of the oxide film was thin. Particularly, it was clear that Examples 1 to 6, 9, 10, 12 to 14, and 17, which satisfy the relation (3), had even higher tensile strength and shear strength, suppressed the void generation, and had thinner oxide films.

On the other hand, Comparative Examples 1 and 2 were inferior in strength due to inappropriate Ag contents, which caused the melting temperatures to fall outside the desired ranges. In Comparative Example 3, the Cu content was low, resulting in an increase in melting temperature. In Comparative Examples 4 and 5, the Cu contents were high, resulting in inferior strength. In Comparative Example 6, the Cu content was too high, resulting in inferior strength and high melting temperature. Comparative Example 7 were inferior in all results due to low Bi content, high In content, and furthermore, not satisfying the relations (1) and (2). In Comparative Example 8, the Bi content was low, resulting in inferior strength and high melting temperature. In Comparative Example 9, the Bi content was high, resulting in inferior strength and low melting temperature.

Comparative Example 10 had a low In content and did not satisfy the relation (1), resulting in an increase in melting temperature and inferior strength. In Comparative Example 11, the In content was low, resulting in a further increase in melting temperature and inferior strength. Comparative Example 12 was inferior in all results due to high In content and not satisfying the relation (2).

Comparative Examples 13 and 14 did not satisfy the relation (1), resulting in inappropriate melting temperatures. Particularly, Comparative Example 14 exceeded the upper limit of the relation (1), resulting in an inappropriate melting temperature, as well as the other results were all inferior. Comparative Examples 15 and 16 did not satisfy the relation (2), resulting in inferior strength. Particularly, Comparative Example 16 exceeded the upper limit of the relation (2), resulting in thicker oxide film in addition to inferior strength. Comparative Examples 17 and 18 contained Ni or Co, resulting in high melting temperatures and increased void area ratios.

The invention claimed is:

1. A solder alloy having an alloy composition consisting of, by mass %:
   Ag: 2.5 to 3.7%,
   Cu: 0.25 to 0.95%,
   Bi: 3.0 to 3.9%, and
   In: 0.5 to 2.3%, with the balance being Sn,
   wherein the alloy composition satisfies the following relations (1) to (3):

$8.1 \leq Ag+2Cu+Bi+In \leq 11.5$  Relation (1)

$1.30 \leq (Bi+In)/Ag \leq 1.66$  Relation (2)

$4.48 \leq Ag \times Cu \times Bi \times In \leq 7.7$  Relation (3)

wherein Ag, Cu, Bi, and In in the relations (1) to (3) each represent the contents (mass %) thereof in the alloy composition.

2. A solder paste comprising solder powders comprising the solder alloy according to claim 1.

3. A solder ball comprising the solder alloy according to claim 1.

4. A solder preform comprising the solder alloy according to claim 1.

5. A solder joint comprising the solder alloy according to claim 1.

* * * * *